Figure 1:
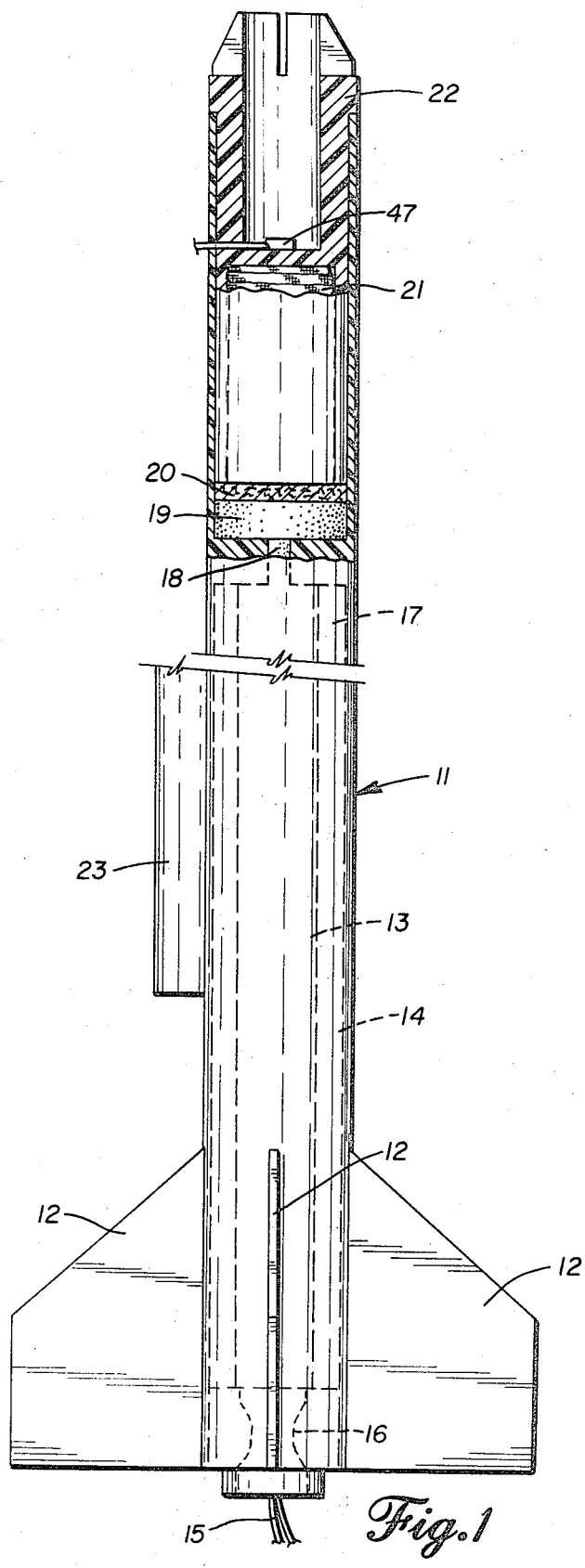

United States Patent [19]
Womack

[11] 3,785,557
[45] Jan. 15, 1974

[54] CLOUD SEEDING SYSTEM

[75] Inventor: William C. Womack, Lafayette, Colo.

[73] Assignee: Colspan Environmental Systems, Inc., Boulder, Colo.

[22] Filed: Dec. 21, 1972

[21] Appl. No.: 317,174

[52] U.S. Cl.............. 239/14, 102/34.1, 102/34.2, 102/34.4
[51] Int. Cl............................................ A01g 15/00
[58] Field of Search.............. 239/2 R, 14; 102/34, 102/34.1, 34.2, 34.4, 34.5, 37.1, 37.6

[56] References Cited
UNITED STATES PATENTS

| 3,038,407 | 6/1962 | Robertson et al. ............. | 102/34.1 |
| 3,251,301 | 5/1966 | Herrmann ....................... | 102/34.2 X |
| 3,721,193 | 3/1973 | Piester ........................... | 102/34.5 |
| 3,736,876 | 6/1973 | Little et al. .................... | 239/2 RX |

FOREIGN PATENTS OR APPLICATIONS

| 777,970 | 3/1935 | France .......................... | 239/2 R |
| 899,496 | 6/1962 | Great Britain ................. | 102/34.1 |
| 1,140,062 | 1/1969 | Great Britain ................. | 102/34.2 |

Primary Examiner—M. Henson Wood, Jr.
Assistant Examiner—A. Kashnikow
Attorney—Bertha L. MacGregor

[57] ABSTRACT

A cloud seeding system comprising a solid propellant rocket motor boosted vehicle and means for launching the vehicle for transporting cloud seeding material to clouds for increasing precipitation and/or suppressing hail growth. The vehicle comprises a pyrotechnical booster element and a seeding material carrier or dart element, automatically separable from each other, the booster element being provided with an automatically releasable parachute or other means for retarding the speed of fallout consisting of the booster motor and an interstage coupling between the two elements released after burnout of the booster and separation of the two elements. Launching means are provided for directing the trajectory of the motor boosted vehicle.

11 Claims, 5 Drawing Figures

PATENTED JAN 15 1974

3,785,557

SHEET 2 OF 2

CLOUD SEEDING SYSTEM

This invention relates to a cloud seeding system utilizing a solid propellant rocket motor boosted vehicle and means for launching the vehicle for the purpose of transporting cloud seeding material to selected clouds or cloud regions for increasing precipitation and/or suppressing hail growth.

One of the objects of the invention is to provide a rocket boosted vehicle that comprises two separable bodies, one of which serves as a pyrotechnical booster element and the other as a seeding material carrier referred to herein as the "payload" or "dart" element that delivers the material to the clouds to be seeded.

Another object of the invention is to provide means for preventing hazardous debris fallout after burning of the pyrotechnical material in the booster element and separation of the booster element from the dart element. This object is achieved by storing in the booster element a parachute, streamers or other retardation means, tied to the rocket motor in the booster element and to the interstage coupler between the booster and dart elements, and automatically releasing the retardation means and parts attached thereto after burnout of the pyrotechnical material in the booster element. The parachute or other retardation means, with attached rocket motor and inter-stage coupler, thus fall to earth at reduced speeds without injury to damage to persons or property.

Another object of the invention is to provide means for automatically separating the booster element from the dart element after burnout of the booster. This is achieved by differential aerodynamic drag due to a significant decrease in cross sectional area of the dart vehicle as compared to the booster element, and an increase in the sectional density of the dart vehicle, whereby the dart element is able to achieve a higher apogee altitude than if the composite vehicle continued the flight as a single vehicle.

Another object of the invention is to provide pyrotechnical time delay means in the booster element or in the booster and dart elements such that cloud seeding nuclei are emitted at the desired altitude. The vehicle is aimed in both azimuth and elevation angles through the use of an adjustable launcher rod to permit nuclei disbursion within selected clouds or cloud regions for the purpose of suppressing hail growth and/or increasing precipitation.

Another object of the invention is to provide the dart element with a low drag "boat-tail" aft portion which aids in preventing deceleration and in maintaining the speed of travel of the cloud seeding material carrier after its separation from the booster element, said boat-tail aft end being releasably seated in the interstage adapter or coupling member that is part of the booster element.

Another object of the invention is to provide vehicle launching means which utilize dual igniters in combination with an electrical and mechanical safety interlock, whereby the electrical system first activates an igniter for firing the rocket motor in the booster element, and a safety electro-mechanical switch detects movement of the vehicle up a launcher rod which is part of the launching means. When sufficient movement is detected to insure that the rocket motor has ignited satisfactorily, a second igniter is automatically activated to ignite the time delay means in the upper stage or dart element of the vehicle.

The booster element may contain one or more solid propellant rocket motors mechanically coupled to function as a composite vehicle. Each motor is sequentially ignited through either an electrical or pyrotechnical igniting device and is separated from the dart element after burnout. Each successive stage or rocket motor fired thus imparts additional energy or velocity to the vehicle payload, carrying it to increasingly higher apogee altitudes. After burnout of the booster, the dart and booster elements are automatically separated by differential aerodynamic drag and the dart containing the cloud seeding material continues on a ballistic trajectory.

The dart vehicle contains a pyrotechnical material which, when ignited, emits cloud seeding nuclei. A pyrotechnical time delay means is ignited when the vehicle is launched so that the cloud seeding nuclei are emitted at the desired altitude.

It is possible to utilize the dart element carrying the cloud seeding material without a booster element. For this purpose, the dart element is "tossed" from a carrier aircraft. When the aircraft has reached an altitude of approximately 45° and while exceeding a minimum speed of 200 knots, the pilot activates a release mechanism which holds the dart vehicle, and a pyrotechnical time delay device in the dart is simultaneously ignited. The released dart thus follows a ballistic trajectory and is injected into the target cloud seeding area. The cloud seeding material is ignited from the time delay means and is dispersed into the cloud.

In the drawings:

FIG. 1 is an elevational view, partly in section, of the booster element of a rocket motor boosted vehicle embodying my invention for transporting cloud seeding material into the atmosphere.

FIG. 2 is an elevational view, partly in section, of the "payload" or dart element of the rocket motor boosted vehicle, designed to be mounted in the coupler end of the booster element shown in FIG. 1.

FIG. 3 is an elevational view of the elements shown in FIGS. 1 and 2, assembled and mounted on a launching rod which is part of a tripod supported launch platform.

FIG. 4 is an elevational side view, on an enlarged scale, of part of the launch means shown in FIG. 3.

FIG. 5 is a perspective view of the launch means, on a reduced scale, illustrating the trajectory of the dart element of the vehicle after the booster element, including the interstage coupler and retardation means, has become separated from the dart element.

Referring to the embodiment of the invention shown in the drawings, the assembled rocket vehicle, designated 10 in FIG. 3, comprises the two main elements shown in FIGS. 1 and 2, namely, a rocket motor boosted element and a cloud seeding material carrier referred to as the "dart" element.

The booster element comprises an elongated cylindrical body 11 provided with fins 12 near its tail end. The body 11 preferably is made of fiber glass and contains the solid propellant rocket motor 13 and propellant material 14. An electric igniter 15 is installed through the motor nozzle 16. Forwardly of the rocket motor 13, the booster element body 11 encloses a combustion chamber 17, pyrotechnical time delay means 18 ignited from the electric igniter 15 before launch, an expulsion charge 19 ignited from the time delay means 18, flame protective wadding material 20, a retardation or recovery system 21, and interstage coupler or adapter 22. The body 11 has fastened to it a sleeve form device 23 for mounting the assembled rocket vehicle on launching means described hereinafter.

Figure 2:
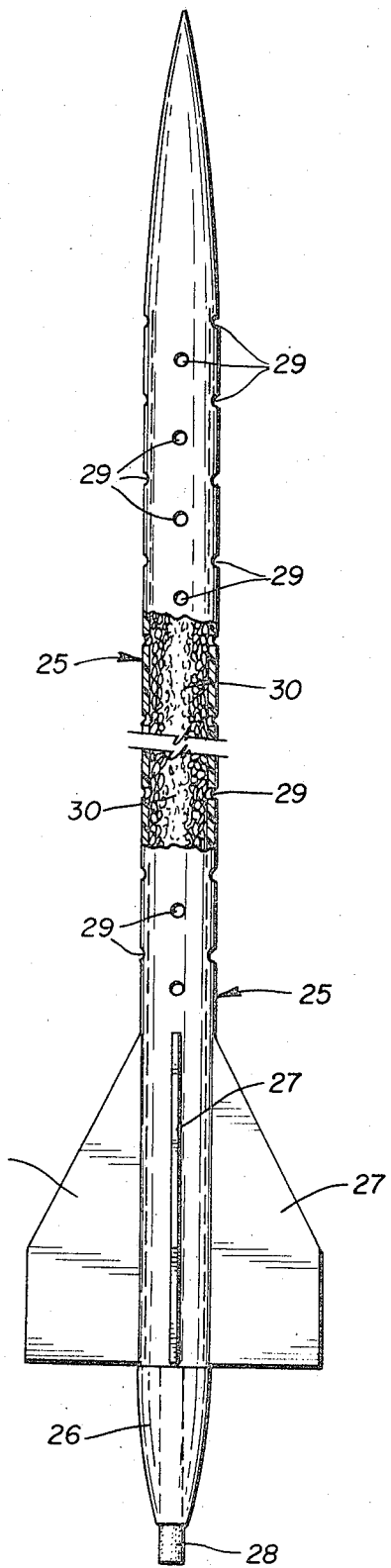

The cloud seeding material carrier or dart element shown in FIG. 2 is an elongated cylindrical body 25 of phenolic material, smaller in diameter than the body 11 of the booster element. The body 25 has a boat-tial end 26 rearwardly of the fins 27, said end 26 being adapted to seat in the interstage adapter 22 of the booster element which releasably couples the two bodies 11 and 25 together. The boat-tail end 26 contains pyrotechnical time delay means 28. The body 25 is provided with vent holes 29 forwardly of the time delay means 28 for containing pyrotechnical cloud seeding material 30 in perforated cylindrical shape which is ignited along the interior surface of the cylinder, the burning gas being vented through both the cylinder end and through the venting holes 29 positioned along the length of the cylinder. This configuration increases the burning rate as a result of the greater exposed surface burning area.

Figures 3, 4, 5:
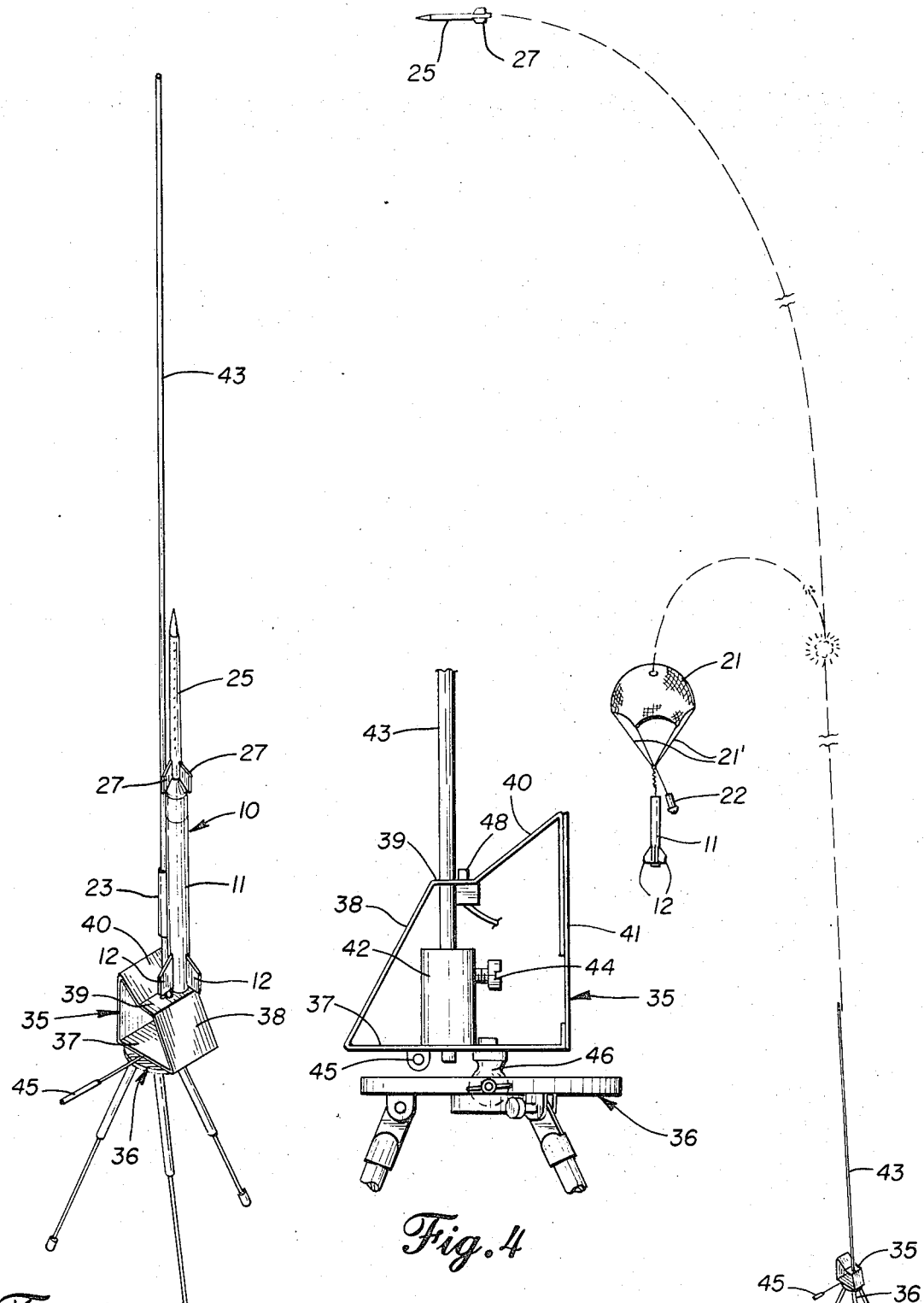

The cloud seeding system of my invention includes vehicle launching means shown in FIGS. 3-5, comprising a rod mount 35 supported on a tripod unit 36. The mount 35 consists of a piece of sheet metal or other suitable material bent to form a base plate 37, upwardly inclined wall 38, horizontal area 39, upwardly inclined wall 40 and a vertical downwardly extending wall 41. A block 42 mounted on the base plate 37 is bored to receive the end of a rod 43, usually about 8 ft. in length, retained by a set screw 44. The horizontal area 39 is apertured to receive the rod 43. The rod mount 35 is mounted to swivel on the tripod unit 36 by aid of the handle 45. The mount 35 can be tilted by the universal joint 46 between the mount and the supporting unit 36.

The igniter 15 in the rear end of the booster element is ignited by any suitable means when the vehicle 10 has been mounted on the rod 43 of the launcher. After launching, the time delay means 18 is ignited, followed by igniting of the expulsion charge 19 and flame protective wadding material 20. Then the igniter 47 located in the coupling or adapter 22 is activated. The launcher 35 is provided with an electrical or mechanical safety switch 48 whereby the system first activates the igniter 15 for firing the rocket motor 13 in the booster element and when the safety switch 48 detects sufficient movement of the vehicle 10 to insure that the rocket motor has ignited satisfactorily, the igniter 47 is ready to be activated to ignite the time delay means 28 in the dart element. The safety switch 48 may be located on the launcher in such position that the fins 12 of the booster element body 11 bear on the switch 48 and maintain it in inactive condition, and as soon as the igniter 15 has functioned to initiate the firing of the rocket motor and movement of the vehicle upwardly on the rod 43, the safety switch permits the igniter 47 in the coupler 22 to function as intended to ignite the time delay means 28 in the dart element 25.

As shown in FIG. 5, the parachute 21 has shroud lines 21' tied to the rocket motor 13 in the booster element body 11 and to the interstage coupler 22. The parachute or other retardation means, together with said attachments, namely, the rocket motor and the coupler, are released by the burnout of the pyrotechnical contents of the booster element and separation of the booster and dart elements.

The retardation system which slows the descent of the fallout consisting of the rocket motor 13 and the adapter 22 attached to the parachute 21 or other retardation means is employed in either the booster-dart vehicle or in a vehicle equipped with multi-stage rocket motors in the booster element or equipped with rocket motors in both the booster element and the dart element. If the dart element, carrying the cloud seeding material, is not part of a rocket motor boosted vehicle, but is carried by aircraft to the cloud region to be seeded, then retardation of fallout means is not needed.

I claim:
1. A cloud seeding system comprising
   a. a pyrotechnical solid fuel propelled booster element having a hollow body containing a rocket motor,
   b. means igniting the motor fuel,
   c. an adapter unit releasably mounted on the forward end of the booster element,
   d. a dart element having a hollow body containing cloud seeding material, said dart element being releasably mounted on the adapter unit,
   e. fall-out retardation means releasably mounted in the booster element adjacent the adapter unit, and
   f. expulsion means ignited by the motor fuel automatically releasing the fall-out retardation means.

2. The system defined by claim 1, in which the fall-out retardation means is a parachute having lines attached to the booster element and the adapter unit for slowing the speed of descent of the attached booster element and adapter unit after burnout of the booster element and release from the dart element.

3. The cloud seeding system defined by claim 1, in which the booster element body is of greater diameter than the dart element body.

4. The cloud seeding system defined by claim 1, in which the rearward end of the dart element is low-drag, boat-tail shaped that aids to prevent deceleration of the dart element and to maintain its speed after separation from the booster element and adapter unit.

5. The cloud seeding system defined by claim 1, which includes pyrotechnical time delay means in the booster element between the rocket motor and the expulsion means for releasing the fall-out retardation means.

6. The cloud seeding system defined by claim 1, in which the cloud seeding material is pyrotechnical material, and in which the dart element includes pyrotechnical time delay means located in the rear end of the dart element to time-control ignition and dispersion of the seeding material.

7. The system defined by claim 1, which includes a launching device for launching the vehicle consisting of the assembled booster element, adapter and dart element, and means on the booster element engaging the launching device.

8. The system defined by claim 7, in which the launching device includes an upright rod and means for adjusting the angle of the rod, and the means on the booster element engaging the launching device is a sleeve-form attachment slidable on the launching rod.

9. The system defined by claim 6, in which the dart element is provided with vent holes in its hollow body for passage of burning gas from the pyrotechnical seeding material.

10. A cloud seeding system comprising
a. a pyrotechnical solid fuel propelled booster element having a hollow cylindrical body containing a rocket motor,
b. means igniting the motor fuel,
c. an adapter unit releasably mounted on the forward end of the booster element,
d. fall-out retardation means releasably mounted in the booster element adjacent the adapter unit,
e. expulsion means ignited by the motor fuel automatically expelling the fall-out retardation means,
f. time delay means between the motor and the expulsion means,
g. a dart element having a hollow body containing pyrotechnical cloud seeding material, said dart body being smaller in diameter than the booster body and releasably mounted in the adapter unit, said dart body being provided with openings for passage of gas from the seeding material, and
h. time delay means between the rearward end of the dart body and the seeding material.

11. The system defined by claim 10, including launching means having an upright rod, the booster element being provided with a sleeve form attachment for sliding movement on said launch rod.

\* \* \* \* \*